UNITED STATES PATENT OFFICE.

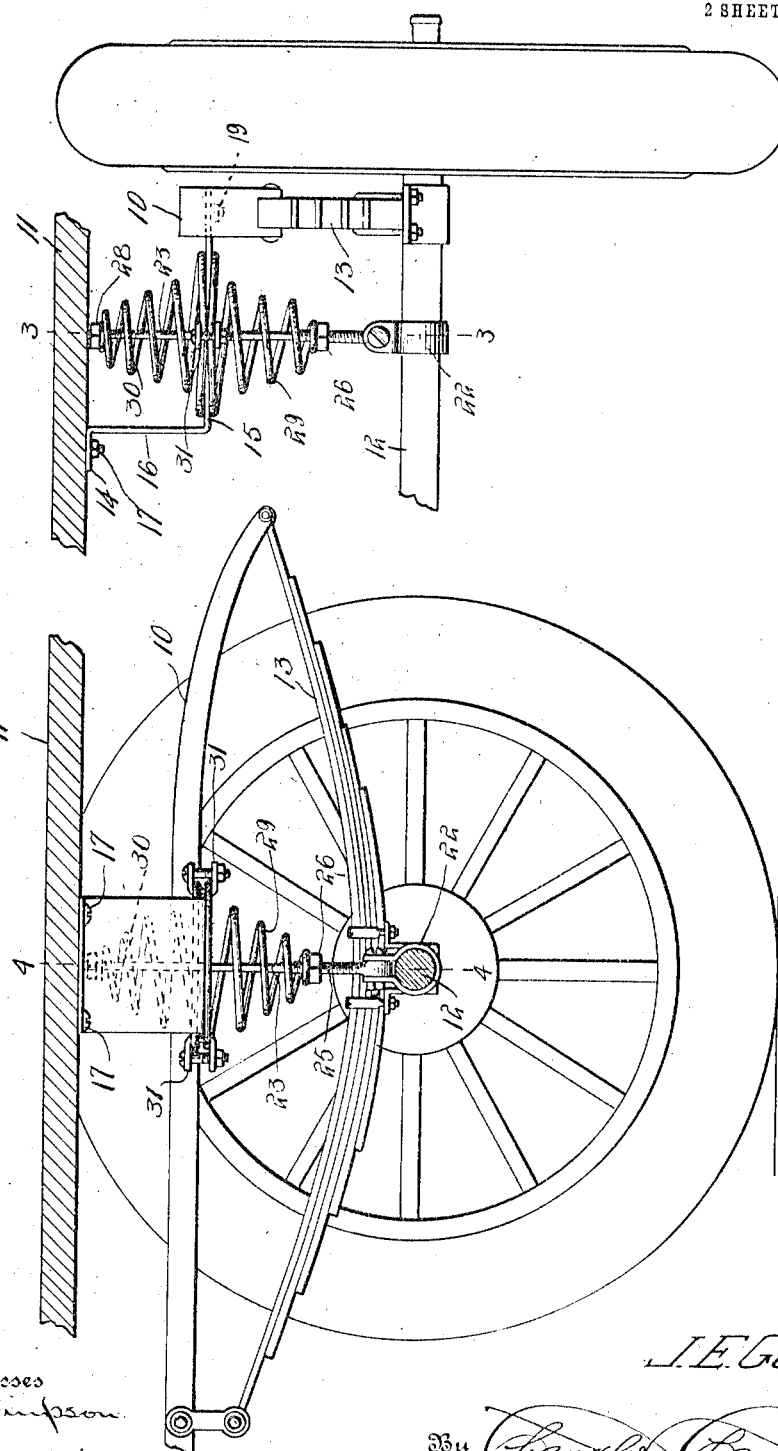

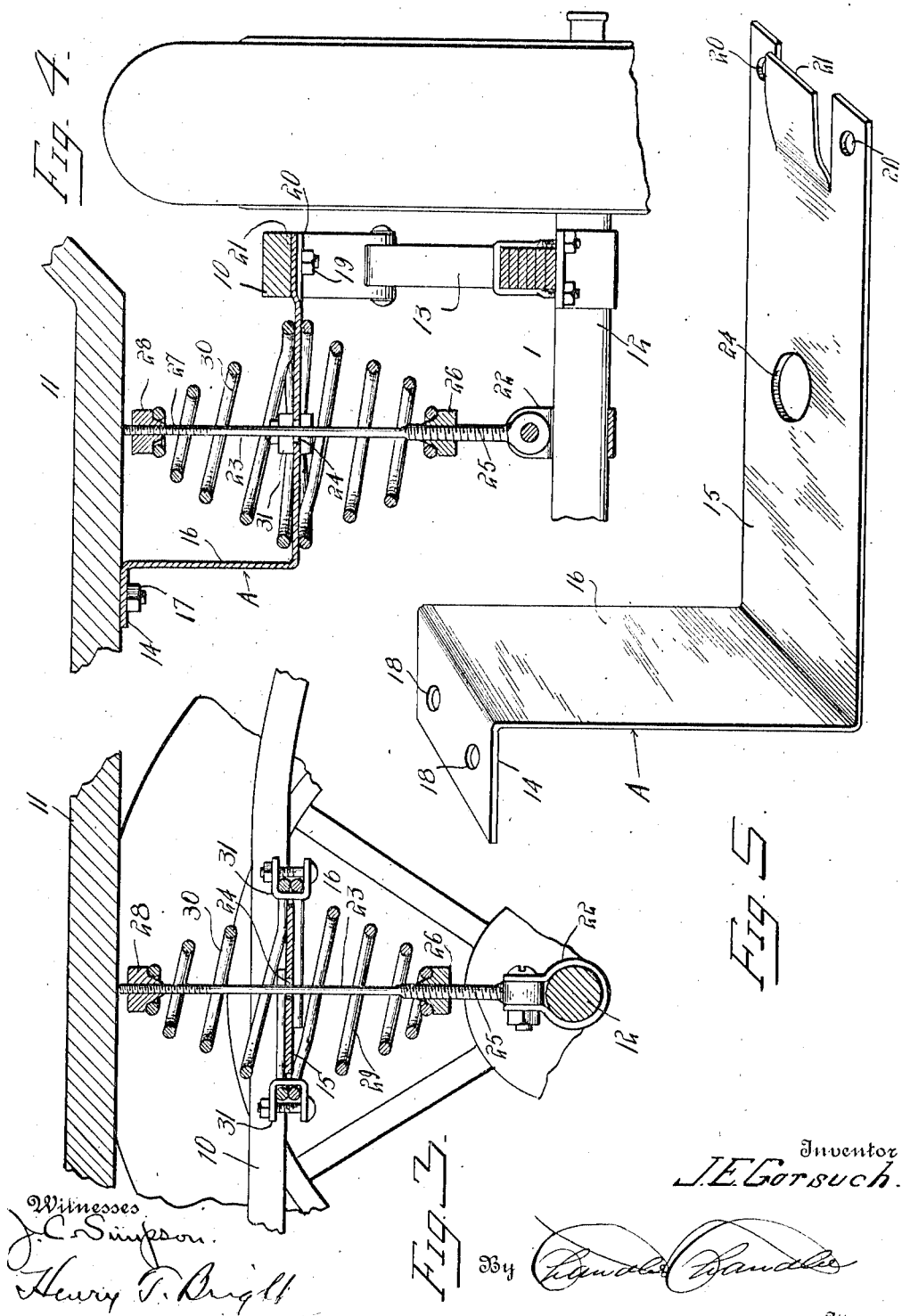

JOSEPH E. GORSUCH, OF ROARING SPRING, PENNSYLVANIA.

SHOCK-ABSORBER.

1,066,407. Specification of Letters Patent. Patented July 1, 1913.

Application filed October 9, 1911. Serial No. 653,553.

*To all whom it may concern:*

Be it known that I, JOSEPH E. GORSUCH, a citizen of the United States, residing at Roaring Spring, in the county of Blair, State of Pennsylvania, have invented certain new and useful Improvements in Shock-Absorbers; and I do hereby declare the following to be a full, clear, and exact description of the invention, such as will enable others skilled in the art to which it appertains to make and use the same.

This invention relates to shock absorbers.

The object of the invention resides in the provision of a shock absorber adapted to efficiently prevent disagreeable rebounding, violent compression or breaking of the springs of an automobile as a result of inequalities of the road surfaces.

A further object of the invention resides in the provision of a shock absorber which will be simple in construction, easily applied to any type of automobile, and adapted to be manufactured and sold at a comparatively small cost.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a fragmental section taken longitudinally through the rear end of an automobile showing the shock absorber applied, Fig. 2, a rear view of what is shown in Fig. 1, Fig. 3, an enlarged section on the line 3—3 of Fig. 2, Fig. 4, an enlarged section of the absorber on the line 4—4 of Fig. 1, and Fig. 5, a detail perspective view of the bracket member of the absorber.

Referring to the drawings, 10 indicates the frame of the automobile, 11 the body supported on said frame, 12 the axle and 13 the ordinary spring supporting the frame 10 upon said axle.

The shock absorber proper is shown as comprising a bracket A which includes off-set parallel portions 14 and 15 and a mutually connecting intermediate portion 16, the portions 14 and 15 being disposed horizontally and transversely of the automobile, and the portion 16 vertically thereof when the bracket is applied. The portion 14 is secured to the body 11 of the automobile by means of bolts 17 passing through respective openings 18 in said portion 14. The portion 15 of the bracket is secured to the frame 10 by means of bolts 19 passing through openings 20 respectively in the free end of said portion. This free end of the portion 15 has struck therefrom intermediate the openings 20 a tongue 21 which forms a spring bearing against the frame 10 and preventing rattling of the joint between the frame and the portion 15. Surrounding the axle 12 is a clip 22 which has pivoted between the ends thereof the lower end of a rod 23, said rod extending substantially vertical with respect to the automobile and passing through an opening 24 in the portion 15 of the bracket A. The lower end of the rod 23 is threaded as at 25 and has mounted thereon an adjusting nut 26; likewise the upper end of the rod 23 is threaded as at 27 and has mounted thereon an adjusting nut 28. Surrounding the rod 23 beneath the portion 15 of the bracket A with its major end bearing against the lower face of the portion 15 and its minor end bearing against the nut 26 is a cone spring 29. Another cone spring 30 surrounds the rod 23 above the portion 15 of the bracket A and has its major end bearing against the upper face of the portion 15 and its minor end against the nut 28. By this construction it will be apparent that by the manipulation of the nuts 26 and 28 the tension of the springs 29 and 30 respectively may be adjusted to suit the particular service demanded of them. The adjacent end of the springs 29 and 30 are clamped together by means of clips 31 which will prevent independent rotation of said springs about the rod 23. It will be further noted that by reason of the pivotal connection between the clip 22 and the rod 23 the shock absorber can readily adjust itself when the body 11 of the automobile moves longitudinally of the frame 10.

From the foregoing description taken in connection with the accompanying drawings it will be apparent that there has been provided an exceedingly simple shock absorber which may be easily and quickly applied to various types of automobiles, and when so applied will efficiently perform the functions for which it is intended.

What is claimed is:

A shock absorber comprising an angle bracket having its free ends provided with means for attachment to an automobile body and springs respectively so that one of said arms will be disposed vertically to the automobile and the other horizontally, said last named arm of the bracket being provided with an opening, a rod passing through said opening and having an attaching clip pivotally secured to one end thereof, a pair of opposed volute springs encircling the rod and bearing at their major ends against the upper and lower faces of the horizontal arm of the bracket respectively, and nuts threaded on the upper and lower ends of the rods and engaging respectively the outer ends of said spring whereby the tension of the latter may be adjusted by the manipulation of said nuts.

In testimony whereof, I affix my signature, in presence of two witnesses.

JOSEPH E. GORSUCH.

Witnesses:
R. J. LOWER,
J. S. TATE.

Copies of this patent may be obtained for five cents each, by addressing the "Commissioner of Patents, Washington, D. C."